(12) United States Patent
Triano et al.

(10) Patent No.: US 7,409,794 B2
(45) Date of Patent: Aug. 12, 2008

(54) FISHING LINE CASTING AND BAIT PROJECTILE SYSTEM

(76) Inventors: Daniel Triano, 3256 Summer Valley Rd., New Ringgold, PA (US) 17960; Thomas Heyer, 3507 Summer Valley Rd., New Ringgold, PA (US) 17960; Douglas Osenbauch, 1884 W. Penn Pike, New Ringgold, PA (US) 17960

( * ) Notice: Subject to any disclaimer, the term of this patent is extended or adjusted under 35 U.S.C. 154(b) by 247 days.

(21) Appl. No.: 11/229,993

(22) Filed: Sep. 19, 2005

(65) Prior Publication Data
US 2006/0059764 A1   Mar. 23, 2006

Related U.S. Application Data

(60) Provisional application No. 60/611,861, filed on Sep. 20, 2004.

(51) Int. Cl.
*A01K 91/02* (2006.01)
(52) U.S. Cl. .............. 43/19; 124/73; 206/145; 206/147; 206/158; 249/117; 249/119; 249/120; 249/127; 294/87.2
(58) Field of Classification Search .............. 43/19; 206/139, 145, 147, 148, 150, 152, 153, 158, 206/160; 220/628, 631, 633, 635; 294/87.2; 124/56, 60, 69, 70, 73, 74, 76; 249/117, 249/119, 120, 66.1, 69, 70, 127
See application file for complete search history.

(56) References Cited

U.S. PATENT DOCUMENTS

| | | | | |
|---|---|---|---|---|
| 45,255 A | * | 11/1864 | Mackey | 249/120 |
| 344,936 A | * | 7/1886 | Bertlett | 124/73 |
| 352,110 A | | 11/1886 | Bartlett | |
| 1,017,746 A | * | 2/1912 | Glerum | 124/73 |
| 1,245,093 A | * | 10/1917 | Doubleday | 124/73 |
| 1,592,066 A | * | 7/1926 | Barnes | 249/120 |
| 1,705,328 A | * | 3/1929 | Griffith | 249/127 |
| 1,831,047 A | * | 11/1931 | Thomas | 249/120 |
| 1,873,081 A | * | 8/1932 | Von Witzki | 249/120 |
| 1,964,476 A | * | 6/1934 | Newman | 249/120 |
| 2,080,816 A | * | 5/1937 | Grunwald | 249/120 |
| 2,090,731 A | * | 8/1937 | Klein | 43/19 |
| 2,100,288 A | * | 11/1937 | Horlacher | 249/120 |

(Continued)

FOREIGN PATENT DOCUMENTS

DE  2006014639 U1 * 1/2007

(Continued)

*Primary Examiner*—Darren W Ark

(57) ABSTRACT

A powered fishing line casting system utilizing compressed air is provided to cast a projectile provided with fishhooks and bait, and to which the fishing line to be cast is attached, to greater distances than could be achieved using conventional casting methods. The system includes a hollow launch tube sized to accommodate insertion of the projectile. A reducer is disposed adjacent to one end of the launch tube and is adapted to receive a flow of compressed gas from an accumulator tank and to discharge a stream of high-velocity air that impinges upon the projectile disposed within the launch tube in order to launch the projectile. A manually-operable valve is interposed between the reducer and the accumulator tank to control the flow of air to the reducer. Spaced-apart front and rear support legs provide stable support for the system during and between launches of a fishing line carrying projectile.

18 Claims, 4 Drawing Sheets

U.S. PATENT DOCUMENTS

| | | | | |
|---|---|---|---|---|
| 2,153,315 | A * | 4/1939 | Richter | 43/19 |
| 2,166,560 | A * | 7/1939 | Schmelzer | 249/120 |
| 2,182,369 | A * | 12/1939 | Barron | 124/81 |
| 2,247,018 | A * | 6/1941 | Henning | 249/119 |
| 2,247,019 | A * | 6/1941 | Henning | 249/120 |
| 2,301,594 | A * | 11/1942 | Voigtritter | 294/87.2 |
| 2,304,841 | A * | 12/1942 | Mikkelsen | 124/73 |
| 2,330,961 | A * | 10/1943 | Dykes | 294/87.2 |
| D142,954 | S * | 11/1945 | Hansen | 220/628 |
| 2,411,193 | A * | 11/1946 | Cummins | 249/119 |
| 2,469,067 | A * | 5/1949 | Follin | 249/120 |
| 2,526,018 | A * | 10/1950 | Foster et al. | 124/73 |
| 2,581,758 | A | 1/1952 | Galliano | |
| 2,591,261 | A * | 4/1952 | Holahan | 249/119 |
| 2,637,475 | A * | 5/1953 | Gialanella | 294/87.2 |
| 2,671,289 | A * | 3/1954 | McCullough | 43/19 |
| 2,703,944 | A * | 3/1955 | Molyneux | 124/73 |
| 2,704,928 | A * | 3/1955 | Curry | 249/120 |
| 2,819,690 | A * | 1/1958 | Baker | 249/119 |
| 2,856,911 | A * | 10/1958 | Maxwell | 124/71 |
| 2,865,669 | A * | 12/1958 | Linthicum | 294/87.2 |
| 2,871,055 | A * | 1/1959 | Glazer | 294/87.2 |
| 2,879,100 | A * | 3/1959 | Moore | 294/87.2 |
| 2,932,386 | A * | 4/1960 | Ushkow | 249/127 |
| 2,946,207 | A * | 7/1960 | Hulterstrum | 249/121 |
| 2,958,975 | A * | 11/1960 | Neff et al. | 43/19 |
| 2,977,706 | A | 4/1961 | Merz | |
| 2,996,329 | A * | 8/1961 | Glazer | 294/87.2 |
| 3,003,805 | A * | 10/1961 | Glazer | 294/87.2 |
| 3,015,182 | A * | 1/1962 | Tuttle et al. | 43/19 |
| 3,028,189 | A * | 4/1962 | Gialanella | 294/87.2 |
| 3,036,853 | A * | 5/1962 | Glazer | 294/87.2 |
| 3,138,149 | A * | 6/1964 | Sinclair | 43/19 |
| 3,184,260 | A * | 5/1965 | Horvath | 294/87.2 |
| 3,202,447 | A * | 8/1965 | Whaley et al. | 294/87.2 |
| 3,206,019 | A * | 9/1965 | Curry, Jr. et al. | 294/87.2 |
| 3,279,115 | A | 10/1966 | Worsham | |
| 3,321,076 | A * | 5/1967 | Poupitch | 294/87.2 |
| 3,370,700 | A * | 2/1968 | Shazor, Jr. | 294/87.2 |
| 3,400,480 | A | 9/1968 | Worsham | |
| 3,400,703 | A | 9/1968 | Rhodes | |
| 3,416,256 | A | 12/1968 | Blocker | |
| 3,419,991 | A * | 1/1969 | Mitchell | 43/19 |
| 3,454,156 | A * | 7/1969 | Chatten | 206/160 |
| 3,468,051 | A * | 9/1969 | Duperron | 43/19 |
| 3,494,061 | A * | 2/1970 | Pool | 43/19 |
| 3,583,381 | A * | 6/1971 | Eaton et al. | 124/73 |
| 3,587,846 | A * | 6/1971 | Heler | 294/87.2 |
| 3,601,439 | A * | 8/1971 | Poupitch | 294/87.2 |
| 3,610,222 | A * | 10/1971 | Hartman | 124/73 |
| 3,662,729 | A * | 5/1972 | Handerson | 124/73 |
| 3,717,947 | A * | 2/1973 | Nomura | 43/19 |
| 3,721,419 | A * | 3/1973 | Bolinger | 249/120 |
| 3,751,098 | A * | 8/1973 | Owen | 294/87.2 |
| 3,828,459 | A * | 8/1974 | Easom | 43/19 |
| 3,834,056 | A * | 9/1974 | Filippi et al. | 43/19 |
| 3,855,988 | A * | 12/1974 | Sweeton | 124/56 |
| 3,871,541 | A * | 3/1975 | Adomaitis | 220/606 |
| 3,881,621 | A * | 5/1975 | Adomaitis | 220/606 |
| 3,884,354 | A * | 5/1975 | Guenther et al. | 294/87.2 |
| 3,913,778 | A * | 10/1975 | Oglesbee | 220/23.83 |
| 3,935,955 | A * | 2/1976 | Das | 220/606 |
| 4,019,480 | A | 4/1977 | Kenaio | |
| 4,022,363 | A * | 5/1977 | Eliassen | 294/87.2 |
| 4,110,929 | A | 9/1978 | Weigand | |
| 4,186,907 | A * | 2/1980 | Snodgrass | 43/43.12 |
| 4,249,667 | A * | 2/1981 | Pocock et al. | 220/606 |
| 4,249,766 | A * | 2/1981 | Erickson | 294/87.2 |
| 4,288,013 | A * | 9/1981 | Napier | 294/87.2 |
| 4,294,366 | A * | 10/1981 | Chang | 220/606 |
| 4,355,728 | A * | 10/1982 | Ota et al. | 220/606 |
| 4,360,231 | A * | 11/1982 | Bolin | 294/87.2 |
| 4,471,987 | A * | 9/1984 | Erickson | 294/87.2 |
| 4,501,085 | A * | 2/1985 | Barnes | 43/19 |
| 4,523,677 | A * | 6/1985 | Schurmann | 294/87.2 |
| 4,560,064 | A * | 12/1985 | Peterson et al. | 294/87.2 |
| 4,564,106 | A * | 1/1986 | Shilcock | 294/87.2 |
| 4,566,591 | A * | 1/1986 | Turtschan et al. | 206/148 |
| 4,569,440 | A * | 2/1986 | Steiger | 294/87.2 |
| 4,623,185 | A * | 11/1986 | Thomas | 206/158 |
| 4,631,852 | A | 12/1986 | Whritenour | |
| 4,703,869 | A | 11/1987 | De Rooy | |
| 4,756,113 | A | 7/1988 | Eggertson et al. | |
| 4,774,928 | A | 10/1988 | Kholin | |
| 4,785,949 | A * | 11/1988 | Krishnakumar et al. | 220/606 |
| 4,785,950 | A * | 11/1988 | Miller et al. | 220/606 |
| 4,865,206 | A * | 9/1989 | Behm et al. | 220/606 |
| 4,883,620 | A * | 11/1989 | Follett | 264/72 |
| 4,910,908 | A * | 3/1990 | Rosenburg | 43/44.89 |
| 4,917,428 | A * | 4/1990 | Sola | 206/145 |
| 4,951,644 | A | 8/1990 | Bon | |
| 5,016,750 | A * | 5/1991 | Gordon | 206/150 |
| 5,024,340 | A * | 6/1991 | Alberghini et al. | 220/606 |
| 5,060,413 | A * | 10/1991 | Garcia | 43/19 |
| 5,071,331 | A * | 12/1991 | Falco | 249/120 |
| 5,133,330 | A * | 7/1992 | Sharp | 124/56 |
| 5,139,162 | A * | 8/1992 | Young et al. | 220/606 |
| 5,149,290 | A | 9/1992 | Reveen | |
| 5,160,059 | A * | 11/1992 | Collette et al. | 220/606 |
| 5,191,975 | A * | 3/1993 | Pezzoli et al. | 206/427 |
| 5,207,150 | A * | 5/1993 | Wellman et al. | 249/120 |
| 5,221,002 | A * | 6/1993 | Garganese | 294/87.2 |
| 5,250,315 | A * | 10/1993 | Loew et al. | 62/1 |
| 5,421,116 | A * | 6/1995 | Moon | 43/19 |
| 5,427,258 | A * | 6/1995 | Krishnakumar et al. | 220/633 |
| 5,427,565 | A | 6/1995 | Godichon | |
| 5,441,171 | A | 8/1995 | Maury | |
| 5,450,839 | A | 9/1995 | Nicolaevich et al. | |
| 5,476,170 | A * | 12/1995 | Weber | 206/153 |
| 5,609,039 | A * | 3/1997 | Green et al. | 62/457.3 |
| 5,660,160 | A | 8/1997 | Prescott, Jr. | |
| 5,689,909 | A | 11/1997 | Cheney, Jr. | |
| 5,813,165 | A * | 9/1998 | Dougherty, Sr. | 43/43.1 |
| 5,878,735 | A | 3/1999 | Johnson | |
| 5,882,057 | A * | 3/1999 | Fahy | 294/87.2 |
| 5,971,352 | A * | 10/1999 | Kirks | 249/119 |
| 6,209,849 | B1 * | 4/2001 | Dickmeyer | 249/120 |
| 6,276,353 | B1 | 8/2001 | Briggs et al. | |
| 6,334,531 | B1 * | 1/2002 | Valkovich | 294/87.2 |
| 6,345,802 | B2 * | 2/2002 | Moore | 249/119 |
| 6,497,066 | B1 * | 12/2002 | Harrison | 43/19 |
| 6,644,294 | B2 | 11/2003 | Christensen | |
| 6,808,070 | B2 * | 10/2004 | Borg | 294/87.2 |
| 7,147,100 | B1 * | 12/2006 | Borg | 294/87.2 |
| 7,377,382 | B2 * | 5/2008 | Borg et al. | 294/87.2 |
| 2002/0033393 | A1 * | 3/2002 | Fux | 220/628 |
| 2004/0139647 | A1 * | 7/2004 | Esberger | 43/19 |
| 2005/0006256 | A1 * | 1/2005 | Ben-Ami et al. | 206/139 |
| 2005/0016514 | A1 * | 1/2005 | Nadel | 124/56 |
| 2005/0188979 | A1 * | 9/2005 | Berry | 124/76 |
| 2006/0042967 | A1 * | 3/2006 | Sanders | 206/150 |
| 2006/0185219 | A1 * | 8/2006 | Giordano et al. | 43/19 |
| 2006/0254934 | A1 * | 11/2006 | Borg | 206/139 |
| 2006/0278541 | A1 * | 12/2006 | Mendoza | 206/145 |
| 2007/0039836 | A1 * | 2/2007 | Borg et al. | 206/150 |
| 2007/0251136 | A1 * | 11/2007 | Mamae | 43/19 |

FOREIGN PATENT DOCUMENTS

| | | | |
|---|---|---|---|
| FR | 2433292 | A * | 4/1980 |
| FR | 2747536 | A1 * | 10/1997 |
| JP | 11-18644 | A * | 1/1999 |

* cited by examiner

FISHING LINE CASTING AND BAIT PROJECTILE SYSTEM

CROSS REFERENCE TO RELATED APPLICATION

The present application claims the benefit of U.S. Provisional Patent Application No. 60/611,861 filed Sep. 20, 2004, which is incorporated herein by reference in its entirety.

FIELD OF THE INVENTION

The present invention relates to the fishing line casting art and, more particularly, to an improved, compressed gas powered fishing line casting system for safely and reliably casting a projectile, to which the fishing line to be cast is attached, to a target area located a distance that could not be reached with conventional casting methods.

BACKGROUND OF THE INVENTION

The sport of fishing is practiced and enjoyed by a large percentage of the population. Many of those who engage in this sport practice that form of fishing known as casting. These fishermen cast from docks, from wharves, from boats, and into the surf, to state but a few examples. It is necessary in casting to have a sufficiently clear working area to facilitate rod, line, and terminal tackle movement. The movement which is made during casting is very dangerous in that the sinker and fishhook describe a launch path from the rear of the fisherman's location and when launched may hit or hook objects or persons that are within the launch path. Thus, most casting methods are ineffective in confined quarters and impose on the fisherman certain restrictive body postures.

Casting methods demand an acquired skill level, hand-eye coordination, timing, etc., to produce consistently accurate results in the placement of the terminal tackle. Casting ability depends on the manner of execution, which in turn depends on a fisherman's skill, physical power and dexterity. The purpose of casting is, of course, to obtain the exact placement of the line in order to increase the probability of success. Such often requires casting bait to distances remote from the location of the fisherman. This is particularly so with respect to surf fishing where a fisherman casting from a beach is required to have considerable skill and accuracy in the placement of the bait in a selected target area in deep water. Often in these circumstances, it is desired to make a cast further than can normally be made by conventional manual casting techniques. This problem is exacerbated in the case of handicapped individuals whose strength and/or physical dexterity is compromised.

As a result, there have been developed various arrangements for providing a powered casting system. Such prior art fishing arrangements have utilized a number of different power providing systems. For example, these devices have employed propulsion mechanisms such as springs, sling-shot type rubber bands, compressed gases and other propellants such as a rocket motors and explosive charges. In general, these systems are complex, expensive, and generally impractical. See for example, U.S. Pat. Nos. 2,977,706; 3,400,840; 3,416,256; 3,419,991; 3,834,056; 4,110,929; 4,631,852; 4,756,113; 5,060,413 and 5,689,909.

In general such prior art arrangements have required modification to the fishing rod, the reel, or development of an entirely new fishing rod structure in order to accommodate the powered casting system. Consequently, such prior art devices have not proved to be completely satisfactory. Moreover, in most instances when these devices are used the forward motion of the propellant rod section during the launching action is suddenly stopped when one mechanical portion physically strikes another with considerable force. This tends to not only jerk the fishing rod from the operator's grasp but also strains certain parts of the rod each time it is used, thereby shortening the rod's useful life.

Further, of the apparatus addressed above, only that described in U.S. Pat. No. 5,060,413 provides a fishing line launching device that does not require a modified or customized fishing rod. The device includes an elongate support having first and second ends. The first end of the support is fitted with a spear or spike-like member which is thrust into the ground at a desired angle in order to anchor the device to the ground. The second end of the support carries a releasable impeller device which launches a fishing line carrying projectile. The impeller device uses pressurized cartridges containing blasting or percussion caps which ignite a charge of gunpowder to launch the projectile. Such explosives are not only unsafe, but also expensive, and a user would be required to carry a considerable supply of the cartridges to launch the number of casts required of a typical fishing excursion. Moreover, the spiked anchor member provides a single anchorage point for the device which is less than desirable with regard to device stability, safety and launching accuracy. More particularly, explosive cartridges generate considerable force that may cause the device and the equipment carried thereby to suddenly shift if the spike is not firmly embedded in the ground. In the event of such a shift, the user may be placed in danger, the projectile will miss its target and a blasting cap will be wasted. Also, the orientation of the support cannot be adjusted without physically extracting the spiked end from the ground and forcing it back into the ground. Such a procedure does not lend itself to precise position adjustments and may require considerable trial and error before a user achieves the desired projectile flight trajectory (which also may result in a number of wasted explosive charges if the support is incorrectly positioned).

Prior powered casting arrangements, therefore, have not met with wide-spread adoption and use as being too mechanically complicated, too expensive to manufacture, too restricted to specific types of terminal tackle, too unwieldy, and/or too functionally infeasible.

A need exists therefore, for a fishing line casting system that that is safe yet powerful, requires no custom fishing rods or modification of existing commercially available fishing rods for its proper operation, is structurally stable and is easily and accurately adjustable to any desired launch trajectory.

The present invention proposes a fishing line casting system for the casting of a projectile, often a bait or lure and/or float or sinker, to which a fishing line is coupled. By utilizing a compressed air powered method of propulsion and direction, the projectile's speed and direction can be controlled such that a projectile of some weight may be delivered to a target area of some distance safely and accurately. Such a casting system will enable all fishermen to have an equal opportunity to be successful independent of their skill or physical power and will decrease the dangers associated with traditional casting methods.

SUMMARY OF THE INVENTION

The present invention relates to a novel and improved fishing line casting system that is relatively simple in construction, which is easy to operate, and which provides accurate launching of a projectile and associated line to points at considerable remote distances. According to one embodiment of the invention, the projectile is a bait or lure and float or weight, to which a fishing line is coupled.

It is a general object of the instant invention to ease the task of casting bait or lures. Another object is to lessen the need for skill in casting, without sacrifice of distance or accuracy. A still further object is to enable casting in close quarters, as in a boat having a top.

It is a further object of the invention to provide an improved fishing line casting system that is extremely economical to operate, in that the power is provided by compressed gas. As used herein, the term "gas" shall include any substance or combination of substances having the general compressibility and flow characteristics of an inert gas, including, without limitation, air, $CO_2$, and/or steam.

It is yet a further object of the invention to provide a compressed gas actuated fishing line casting system utilizing conventional fishing rods and reels.

It is a further object of the present invention to provide a launching system having a safety system such that when loaded, should the launching system be hit or fall violently, the safety system will prevent the launching of the projectile.

These and other unique features and advantages of the present invention will be readily apparent to those skilled in the art from the following detailed description of the preferred embodiments with reference to the accompanying drawings, wherein are set forth, by way of illustration and example, certain embodiments of the invention. The drawings constitute a part of this specification and include exemplary embodiments of the present invention and illustrate various objects and features thereof; the invention not being limited, however, to any particular preferred embodiment.

DETAILED DESCRIPTION OF THE INVENTION

Figure 1:
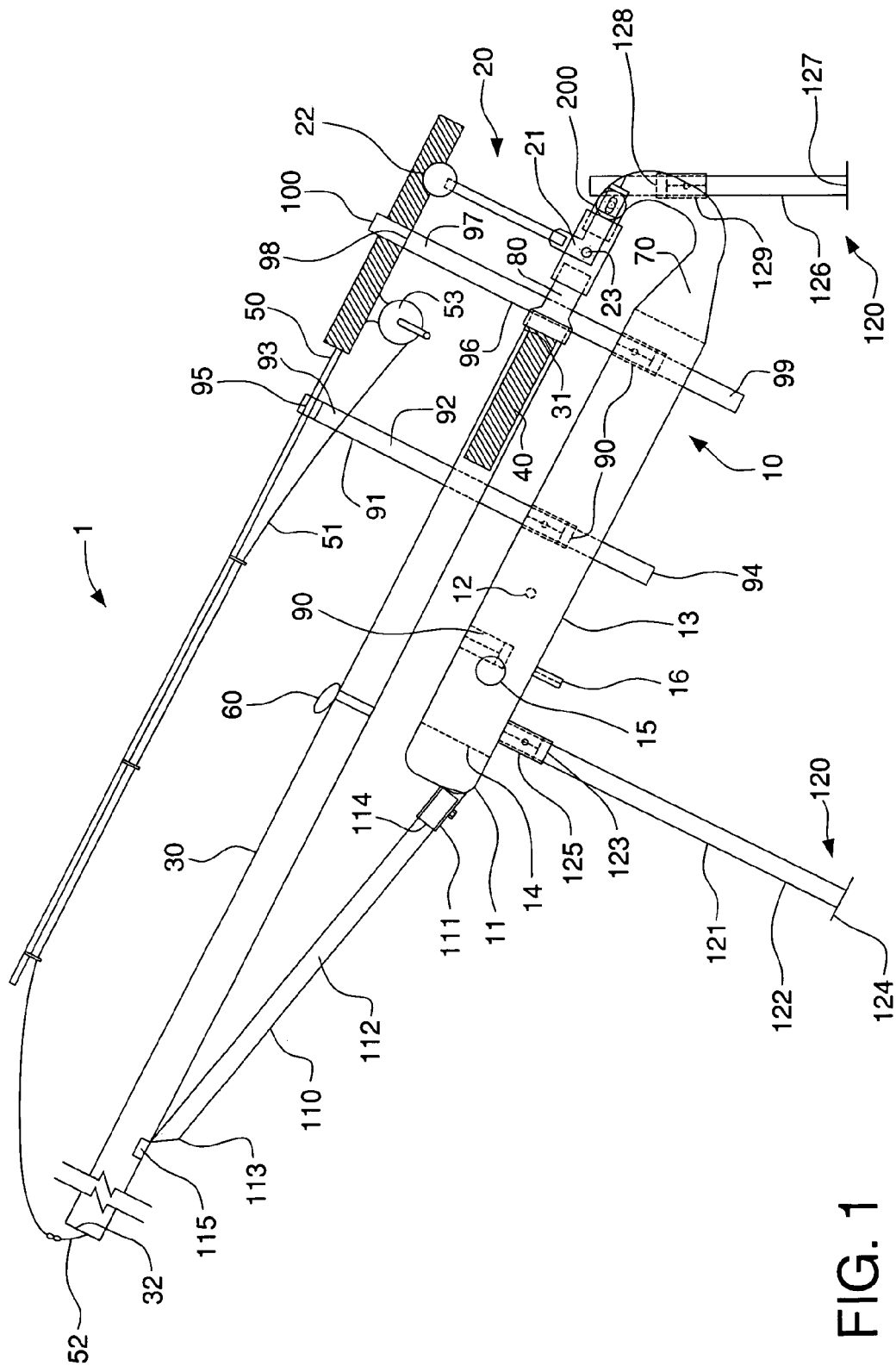
FIG. 1 is a side elevation view of one preferred embodiment of the fishing line casting system having features in accordance with the present invention.
Figure 2:
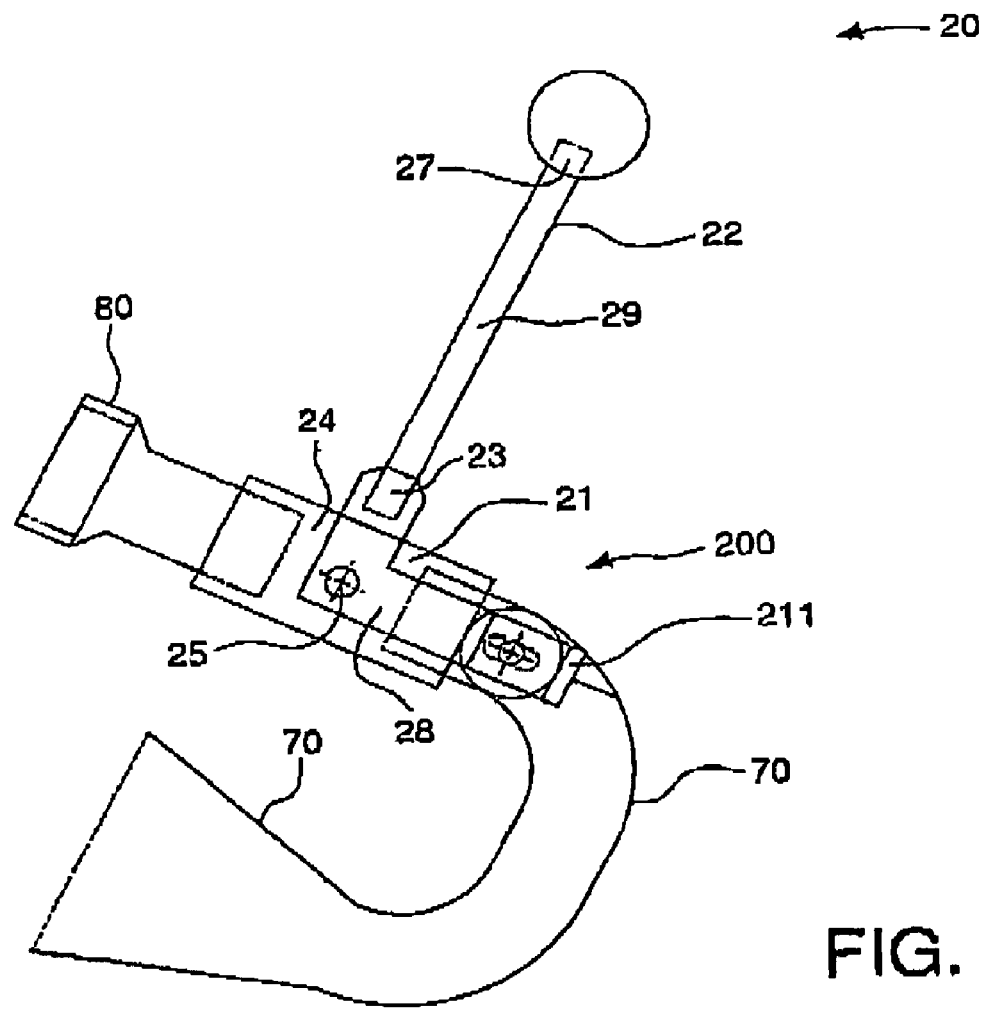
FIG. 2 is a side elevation view of the launching mechanism of FIG. 1.
Figure 3:
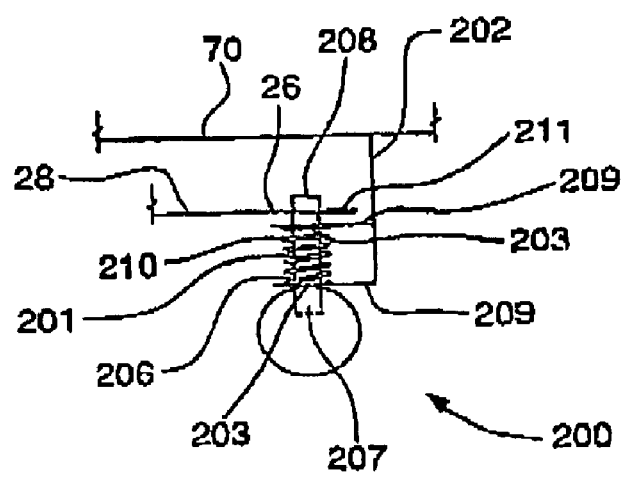
FIG. 3 is a top plan view of the safety switch of FIG. 1.

FIGS. 1-3 show one possible embodiment of a fishing line casting system 1 having features in accordance with the present invention. In a powered fishing line casting arrangement, the present invention contemplates not only the improved compressed gas fishing line casting arrangement in which conventional fishing rods, spinning reels, and other fishing tackle may be conveniently utilized without alteration, but also new and improved structures comprising the individual components of the system. New and improved control means 20 also may be utilized to control the flow of the compressed air. Additional embodiments are contemplated for use in a variety of environments. The apparatus may be utilized on a boat and the support means may vary upon stability requirements.

An integral part of the system is the projectile 40 that is launched by the fishing line casting system and to which the fishing line 51 and, if desired, the bait, is attached. New and improved projectiles also are within the contemplation of the preset invention and such projectiles may generally comprise lures, floats, and/or sinkers. Since lures are generally the bait themselves, there is not usually separate live or dead bait attached to the projectile that is a lure. However, when the projectile comprises a float and/or a sinker, in general, the bait is attached to the projectile via fishhooks.

The fishing line casting system 1 generally comprises compressed gas source means such as an accumulator tank 10, having an inlet valve 12, a control means 20 and a launch tube 30. Projectiles may be inserted into the distal end 32 of the launch tube 30 and will slide down into firing position at the proximal end 31 of the launch tube 30. A projectile 40 is adapted to be launched therefrom upon actuation of the control means 20. A line to be cast, such as fishing line 51, is coupled by any convenient means, such as a swivel, to a casting leader 52 which is attached to the projectile 40 by any convenient means, such as a swivel coupled to the projectile 40 at the base portion thereof which in certain applications may comprise bait. The casting leader 52 generally comprises a braided, metal-coated fishing line.

The fishing line 51 is attached to a conventional spinning reel means 53, preferably an open faced reel, that is attached to a conventional fishing rod 50. The fishing line 51 may comprise any commercially available high-strength fishing line, including without limitation, memory-free, superbraid line treated with a friction reducing agent such as polytetrafluoroethylene (Teflon®) or the like. Since one of the advantages of the present invention is that conventional reels and fishing rods as well as other fishing tackle may be conveniently utilized with the fishing line casting system 1 of the present invention, fishing rod 50 and reel 53 do not, in themselves, form part of the present invention. The fishing line 51 extends from the line guide of the conventional fishing rod 50 and is coupled to a casting leader 52 having a length at least as long as the length of the launch tube 30 being utilized.

In the preferred embodiment shown, the launch tube 30 is provided with an optional fishing line hold 60 through which a fishing line 51 is adapted to be threaded so that the fishing line 51 does not tangle or come off the reel 53 when the line casting system 1 is not in use. The fishing line hold 60 comprises a collar-like member encircling the launch tube 30 at a location near the reel.

Mounting members 90 are provided for adjustable attachment of a fishing rod support 91 and a reel support 96 for placement of a fishing rod 50. The mounting members 90 are spaced apart horizontally on the same side of the accumulator tank 10 and preferably are located substantially parallel to the longitudinal axis of the accumulator tank 10. The fishing rod support 50 comprises a shaft means 92 having a preselected length between an upper end 93 and a lower end 94. The shaft means 92 is held in adjustable locking engagement with the mounting member 90 by releasable clamping means such as a threadedly engaged set screw or the like. Preferably, the clamping means carries an enlarged knob or handle to facilitate tightening and loosening of the clamping means by hand. Fixed to the upper end 93 of the fishing rod support 91, as by welding or the like, is a saddle or yoke 95 for supporting a fishing rod 50. The reel support 96 generally comprises a shaft means 97 having a preselected length disposed between an upper end 98 and a lower end 99. The shaft means 97 is held in adjustable locking engagement with the mounting member 90 by releasable clamping means such as a threadedly engaged set screw or the like. Preferably, the clamping means carries an enlarged knob or handle to facilitate tightening and loosening of the clamping means by hand. Fixed to the upper end of the reel support 96, as by welding or the like, is an annular member 100 for support of a reel 53. The fishing rod support 91 and reel support 96 can be raised or lowered so as to increase or decrease the height of the fishing rod above the launch tube 30. To achieve minimal deflection of the fishing line 51 from the reel 53 down the rod and ultimately of the casting leader 52 down the hollow bore of the launch tube 30 during the cast, the placement of the fishing rod 50 must be such that the longitudinal axis of the launch tube 30 is substantially parallel to the longitudinal axis of the fishing rod 50.

Accumulator tank 10 functions as a pressurized gas reservoir and is provided for storing a charge of compressed gas such as air. It is defined by an end cap 11, a main body 13 and a first, preferably 180° curved, reducer tube 70. Preferably, the accumulator tank 10 and the launch tube 30 are arranged in substantially parallel relationship for optimal positional stability during and between launches of fishing line carrying projectiles. The end cap 11 is secured, as by welding or the like, to the main body of the accumulator tank 10 to provide a structurally sound and air tight chamber for containing the compressed gas. The compressed gas, such as, for example, air, may be provided by an external compressed air supply such as, for example, an electric (AC), battery-operated (DC) or internal combustion powered air compressor or a refillable compressed air filling tank, as desired. The compressed air is communicated to the proximal end 31 of the launch tube 30 from first reducer tube 70 via a second reducer tube 80 which is secured by welding or the like to the proximal end of the main body 13 of accumulator tank 10.

Control means 20 comprises a manually operated quick acting valve 21 and a firing handle 22. Valve 21 is interposed between the first and second reducer tubes 70 and 80, as shown, in order to control the flow of air directed into the proximal end 31 of the launch tube 30. Operation of valve 21 is controlled by a firing handle 22. The valve 21 may be any commercially available conventional type of quick opening valve or it may be a ball valve as shown in FIG. 2. Those skilled in the art will readily appreciate that when the firing handle 22 is actuated, it permits the release of compressed air or other gas from the accumulator tank 10 into the reducer tube 80. The reducer tube 80 converts the compressed gas into a stream of high-velocity gas that impinges on the projectile 40, propelling it along the launch tube 30 and eventually launching it into the air or at a desired target up to 150 to 375 yards away. The reducer tube 80 is utilized for adequate propulsion and is used to propel the projectile from the launch tube 30. Those skilled in the art will readily appreciate that the speed of actuation of the firing handle 22 is directly related to the velocity of the stream of compressed air that impinges on the projectile 40.

The launch tube 30 is preferably threadably secured to the control means 20 via a reducer tube 80 which, in turn, is welded or otherwise attached to the control means 20. The launch tube 30 may be of any desired length. The length and diameter of the launch tube 30 are important as they critically affect the launch of the projectile. The length of the launch tube 30 and the diameter may be varied depending on (i) the size of the projectile, (ii) the height to which the projectile is desired to travel, and (iii) the desired launch distance. With respect to length of the launch tube 30, length generally ranges from about 6 to 10 feet and preferably is at least about 8 feet.

A mounting member 111 is provided at the distal end of the accumulator tank 10 for attachment of proximal end of a launch tube stabilizer 110. The mounting member 111 is secured, as by welding, to end plate 11 of the accumulator tank 10. The launch tube stabilizer 110 generally comprises a shaft means 112 having a preselected length between a distal end 113 and a proximal end 114. The proximal end 114 of the shaft means 112 is preferably held in adjustable locking engagement with the mounting member 111 by releasable clamping means such as a threadedly engaged set screw or the like. Preferably, the clamping means carries an enlarged knob or handle to facilitate tightening and loosening of the clamping means by hand. A yoke or saddle 115 is preferably fixed, as by welding or the like, to the distal end 113 of the shaft means 112 for supporting the launch tube 30. The mounting member 111 preferably is secured to the end cap 11 such that when the launch tube 30 is resting in the yoke or saddle 115 of the launch tube stabilizer 110, the longitudinal axis of the launch tube 30 is substantially parallel to the longitudinal axis of the accumulator tank 10.

The materials of construction of the fishing line casting system 1 as shown in FIGS. 1-3 are preferably conventional, such as stainless steel, PVC, or other suitable corrosion resistant material. In the preferred embodiment, the accumulator tank 10 comprises a stainless steel main body 13 having a diameter of about 4 inches and a length of about 24 inches with a 4 inch diameter end cap 11 having a depth of 2 inches, secured as by welding or the like; at the distal end 14 of main body 13. The preferred embodiment includes a 1½" ball valve 21 mounted between the 1½ inch diameter end of the 180° bent tubing steel first reducer tube 70 (whose opposite four inch diameter end leads from the proximal end of the main body 13 of the accumulator tank 10) and a PVC second reducer tube 80 having a diameter of between 2 and 1½ inches. The firing handle 22 is part of the control means 20 and generally comprises a shaft means 29 that extends vertically upward from the valve chamber 24 and has a preselected length between an outer end 27 and an inner end 23. The valve 21 is actuated by a firing handle 22 coupled, as by welding or the like, to an L-shaped latch means 28. Latch means 28, has an opening 26 and is pivotally attached to the stem portion (not shown) of valve 21.

The latch means 28 has valve end and an outer end 211. A ball swivel (not shown) is disposed at the valve end, a pivot mount 25 is at the center of the valve chamber 24, and opening 26 is located at the outer end 211. The projectile 40 to be launched is loaded through a hollow barrel launch tube 30 preferably constructed of PVC pipe having a diameter of about 2 inches. The launch tube 30 is preferably sized so as to allow free passage of the projectile 40 through the hollow barrel of the launch tube 30 with little frictional resistance.

As noted above, a pressurized gas supply line (not shown) provides pressurized air from an external compressed air supply (not shown) to operate the fishing line casting system 1. The compressed gas supply can be positioned adjacent to or remote from the fishing line casting system 1, as desired.

Referring in more detail to FIG. 1, it can be seen that the accumulator tank 10 is charged with compressed gas through the inlet 12. The inlet 12 may be of any conventional fill valve type commonly utilized to allow filling of the accumulator 10 with pressurized gas from the unillustrated supply of compressed gas.

In the preferred embodiment an optional pressure gauge 15 is provided for allowing viewing of the pressure of air in the accumulator tank 10, and thus, control of the level of air pressure delivered to the valve 21. This may be used, for example, to determine whether the air pressure is sufficient to propel the projectile 40 at a desired velocity or to calibrate the fishing line casting system 1 for desired distance accuracy. The pressure gauge 15 may be coupled to one end of the air supply line or it may be coupled to the accumulator tank 10, as shown. The air pressure may be increased or decreased depending on the velocity and distance desired for the projectile 40. The variation of the pressure determines the thrust of the projectile as well as the launching rate. With a pressure of 125 psi, for example, a distance of 200-250 yards can be obtained. An average increase of 50 yards in range is provided by each additional 25 psi when the pressure is over 125 psi.

A pressure regulator and/or relief valve 16 is also preferably provided in the accumulator tank 10 and/or in the air supply line to ensure that safe air pressure levels are maintained during operation of the fishing line casting system 1. An air pressure of about 100 psi is adequate for satisfactory operation of the fishing line casting system 1.

The system according to the invention preferably includes front and rear support means, including a plurality of legs, for providing a high degree of positional stability to the device during and between launches of fishing line carrying projectiles. As a consequence, the instant system launches fishing line more safely, accurately and reliably than other systems heretofore known in the art. The front support means comprise at least two mounting members 125 secured at their upper ends, as by welding or the like, to the bottom of the accumulator tank 10. In a preferred embodiment, mounting members 125 receive a pair of front legs 121 in a manner such that legs assume an inverted "V" formation. In addition, the mounting members 125 are preferably secured to the accumulator tank 10 such that the front legs 121 are disposed at an acute angle with the surface on which the fishing line casting system 1 is placed. The front legs 121 generally have a preselected length between their lower ends 122 and their upper ends 123. The upper ends 123 of the front legs 121 are held in adjustable locking engagement with the mounting members 125 by releasable clamping means such as a threadedly engaged set screw or the like. Preferably, the clamping means carries an enlarged knob or handle to facilitate tightening and loosening of the clamping means by hand. Plates, brackets or similar means 124 may be fixed, as by welding or the like, to the lower ends 122 of the front legs 121 to aid in securing the fishing line casting system to a surface on which it is placed.

According to a preferred embodiment, the rear support means comprises at least one mounting member 129 secured, as by welding or the like, to the 180° curved tube 70 for placement of a at least one rear support leg 126. According to a presently preferred embodiment, therefore, the front and rear support means comprise at least a three-legged or tripod structural support arrangement for effectuating firm positional stability at all times and on all surfaces. Although not limited thereto, the at least one mounting member 129 is preferably secured such that the at least one rear support leg 126 is disposed substantially at a 90° angle with the surface on which the fishing line casting system 1 is placed. The at least one rear support leg 126 generally has a preselected length between a lower end 127 and an upper end 128. The upper end 128 of the at least one rear support leg 126 is held in adjustable locking engagement with the mounting member 129 by releasable clamping means such as a threadedly engaged set screw or the like. Preferably, the clamping means carries an enlarged knob or handle to facilitate tightening and loosening of the clamping means by hand. The adjustability of the at least one rear support leg 126 permits adjustment of the angle of the launch tube 30 in relation to the surface upon which the system is supported to thereby alter the angle of trajectory of the projectile discharged from the launch tube. A plate, bracket or similar means 124 is preferably fixed, as by welding or the like, to the lower end 127 of each of the at least one rear support leg 126 to aid in securing the fishing line casting system to the surface on which it is placed. As will be appreciated, the front and rear support means according to the invention provide lateral and fore and aft structural stability between and during launches of bait or other fishing related projectiles that was heretofore unattainable by the prior art.

Referring in more detail to FIGS. 2 and 3, it can be seen that in a preferred embodiment a safety switch 200 is provided to retain the firing handle 22 in an upright position when the line casting system 1 is not in use. A pair of mounting members 209 are provided for attachment to a locking pin 201. The mounting members 209 are spaced apart horizontally and secured to the 180° curved tube 70 via a plate means 202 welded substantially perpendicular to the 180° curved tube 70. A spring-loaded locking pin 201 extending from one mounting member to the other, extends through openings 203 of the mounting members 209 such that the inner end 208 of the locking pin 201 extends through the opening 26 of the L-shaped latch means 28. The locking pin 201 generally comprises a shaft means 206 having a preselected length between an outer end 207 and an inner end 208. The inner end 208 of the shaft means 206 is adjacent the L-shaped latch means 28. A spring 210 encircles the shaft means 206 extending from the outer end 207 to the inner end 208. When the inner end 208 of the shaft means 206 extends through the opening 26 of the L-shaped latch means 28, the firing handle 22 is retained in an upright position to prevent inadvertent actuation of the valve 21. Withdrawal of the locking pin 201 allows actuation of the firing handle 22.

In operation, the accumulator tank 10 is filled with the desired gas pressure through the inlet 12 from any suitable supply. The projectile 40 is inserted into the opening of the launch tube 30, which is pointed in the direction in which the projectile is desired to be cast. The fishing line 51 is threaded through the fishing line hold 60. After retracting the locking pin 201, the firing handle 22 is disengaged from the opening 26 of the L-shaped latch means 28, thereby allowing the firing handle 22 to be pushed forward to open the valve 21, and the fishing line 51 is removed from the fishing line hold 60. When the valve 21 is opened, the gas contained in the accumulator tank 10 is released and moves into the reducer 80. The reducer 80 emits a stream of high-velocity gas flow that impinges on the projectile 40 effecting momentum transfer from the high velocity gas flow to the initially stationary projectile 40. Preferably the discharge air flow is of sufficient velocity so as to impart significant motion to the projectile 40, but not so high a velocity as to damage the projectile 40. This may be adjusted by regulating the input air pressure and/or by varying the speed at which the firing handle 22 is actuated. The projectile 40 exits the launch tube 30 in the desired trajectory. The fishing line 51 unwinds from the reel 53 when the cast is made. Thereafter, the fishing rod 50 may be removed from the fishing rod support 91 and reel support 96 and manipulated in the conventional fashion to land the hooked fish and retrieve the terminal tackle. Alternatively, the reel support 96 may be adjusted so that the longitudinal axis of the fishing rod 50 is at a substantially 30° or greater angle with the longitudinal axis of the launch tube 30, and the fishing rod 50 manipulated in the conventional manner while remaining supported by the fishing rod support 91 and the reel support 96.

The projectile to be launched by the fishing line casting system 1 may be of any suitable design or weight, according to the wishes of the user and the type of fish intended to be caught. The only consideration is that the design of the projectile be such that it will fit loosely down the launch tube 10 so that there is little frictional resistance and, thus, will be easily launched.

Although not illustrated, a representative, but not limitative, projectile to which fishing line 51 may be attached may comprise one or more items of fishing tackle such as a sinker, one or more hooks, bait, and a float, which have been submerged in water and frozen in a tubular body or canister prior to use. A presently preferred embodiment of such a canister is described below in connection with FIG. 4. The sinker desirably has a weight suitable to provide appropriate aerodynamic stability during launch and ballistic trajectory of the projectile, as well as suitable anchoring of the hook(s), bait and float upon contact with the bottom surface of a body of water.

One end of a casting leader (e.g., casting leader 52, FIG. 1) is tied or otherwise secured to the fishing line 51. The sinker is preferably secured to the opposite end of the casting leader by any conventional means, such as a swivel. One end of the float is preferably coupled to a bait leader by any conventional means, such as a bale hook. The bait leader generally comprises a braided, metal-coated fishing line. Also secured to the float are one or more hooks accompanied by suitable bait, if so desired. The bait leader is also secured to the sinker and is preferably wound around the float in a proper manner such that, as the frozen water of the projectile thaws, the bait leader begins to easily unwind.

When the cast projectile lands in the water, the weight of the sinker incorporated into the projectile drags down the casting leader while the fishing line unwinds from the reel allowing the projectile to sink into the body of water. When the frozen water component of the projectile thaws the float is set free in the water. The bait leader unwinds from the float and the float, along with the hook(s) and bait, rises upwardly from the sinker for the length of the bait leader until the bait leader assumes a substantially upright position within the body of water. In general, the accelerating forces during launch to which the bait is subjected are not sufficient to cause stripping of the bait from the hooks when the bait is frozen.

Figure 4:
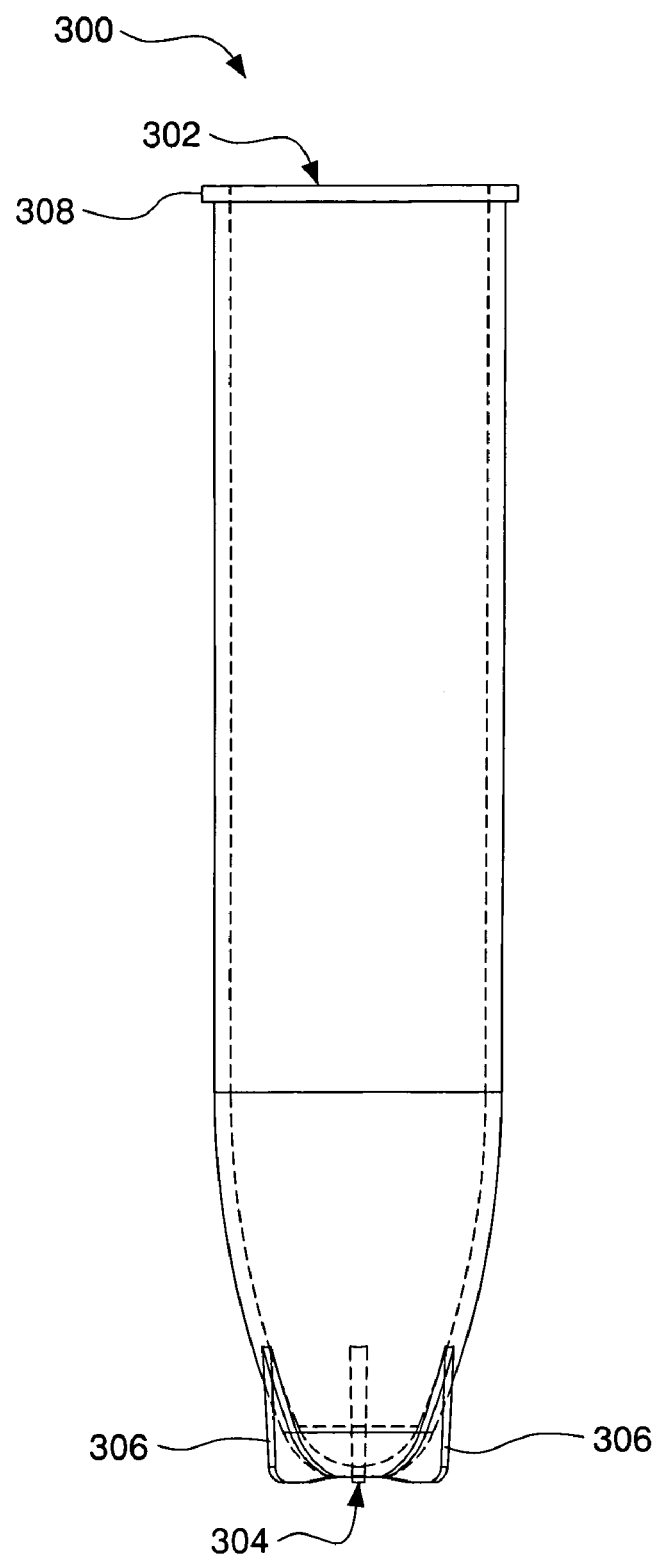
FIG. 4 is an side elevation view of a projectile formation canister constructed in accordance with the present invention.

FIG. 4 depicts a projectile forming canister constructed according to the present invention identified generally by reference numeral 300. Canister 300 is preferably formed from a durable and moderately flexible plastic material such as high density polyethylene ("HDPE") or the like. The canister is generally cylindrical in shape having an open first end 302 and a closed second end 304. A float, sinker, leaders, hook and bait assembly is inserted into the open end 302 of canister 300 and lowered until it comes to rest in the bottom of the canister and the casting leader projects from the canister's open end 302. Some or all of the remaining volume of the canister is then filled with water. The canister is thereafter refrigerated until the water is frozen thereby producing a solid projectile in which the fishing tackle is enveloped and which is suitable for launching by fishing line casting system 1. The circumferential wall of the canister is preferably tapered toward the closed second end 304. The advantages from such a canister shape are two-fold. First, it assists in dislodging the frozen projectile from the canister (which dislodgement is further facilitated if the canister is fabricated from a flexible/ resilient material). Second, the tapered end of the frozen projectile is the forward or leading end of the projectile when it is launched from launch tube 30. The tapered leading end imparts to the projectile an aerodynamic shape similar to the outer configuration of a bullet, missile, rocket or similar ballistic projectile thereby enabling the projectile to efficiently pass through the atmosphere upon launch. The frozen projectile has a diameter preferably slightly less than the inside diameter of the launch tube 30 and a length generally ranging from about 4 to about 16 inches and preferably about 8-10 inches.

The above descriptions of the various types of projectiles that may be utilized in the present invention are illustrative of the many variations that may be incorporated for such utilization. The position, shape, form, color and materials used in the projectile may vary greatly depending on conditions and the desired species of fish being sought. It is understood that extremes from highly visible (brightly colored attractant) to near invisible (transparent), floating to sinking, and erratic to non-erratic retrieval action will be desired under different conditions, and can be obtained by using a wide variety of shapes, patterns, colors, densities and materials without departing from the inventive concept herein disclosed.

In general, it has been found that a typical projectile will weigh on the order of 8 to 24 ounces. Lighter weight projectiles may be utilized with a fishing line that typically may be on the order of 60 pound fishing line. The heavier weight projectiles will require heavier tensile strength fishing lines.

Canister 300 desirably includes support means 306 for maintaining the canister in an upright position so that water does not spill from the canister during freezing. Support means 306 may be releasably or permanently attached to canister 300. Preferably, support means 306 are constructed in the form of a plurality, typically at least three, integral and radially arranged gussets or vanes equiangularly disposed at the outer surface of closed end 304.

Figure 5:
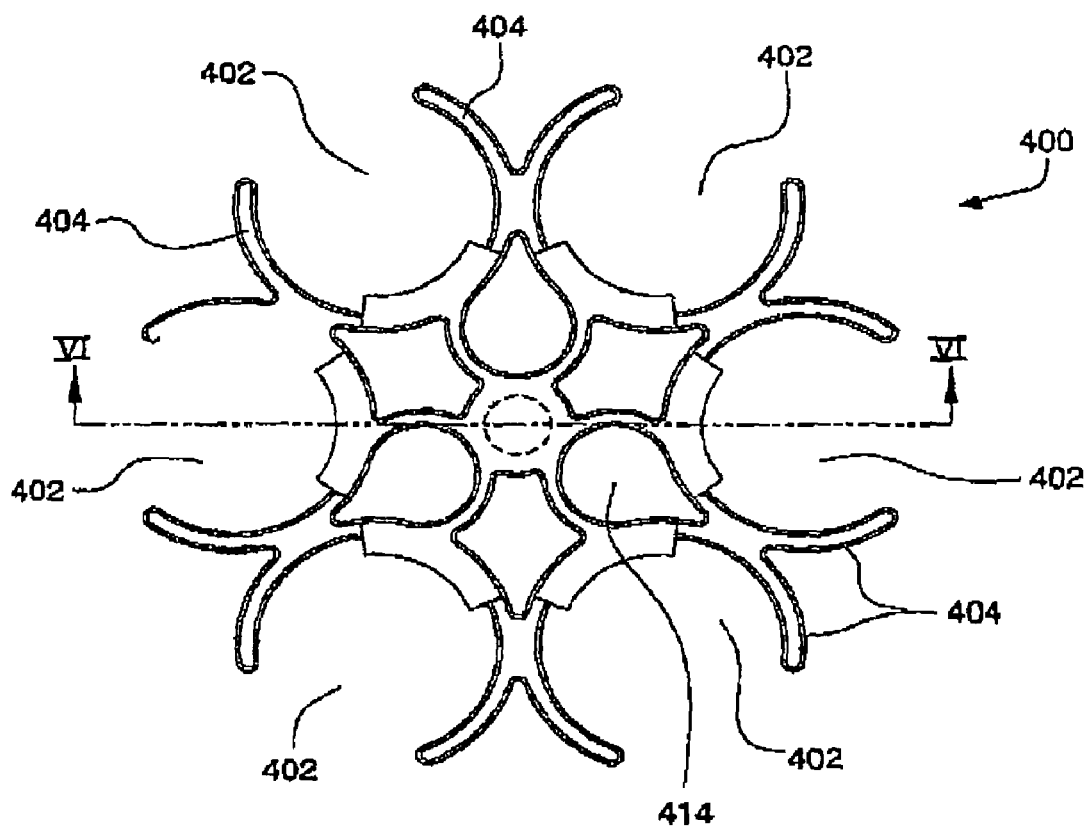
FIG. 5 is a top plan view of a canister carri according to the present invention for releasably retaining a plurality of the canisters illustrated in FIG. 4.
Figure 6:
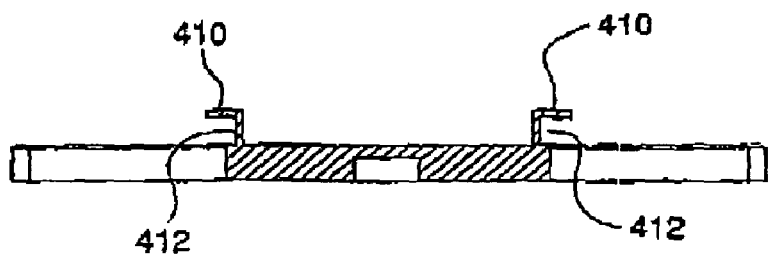
FIG. 6 is a cross-section view of canister carrier according to the present invention taken along line VI-VI.

Canister 300 and canister carrier 400, described below in connection with FIGS. 5 and 6, are preferably provided with cooperating means for preventing slippage of the canister carrier with respect to the canister(s) it holds. According to a presently preferred embodiment, the cooperating means of the canister comprise radially outwardly directed flange means 308 carried by the canister. Such flange means may be constructed as one or more tabs or, more preferably, as depicted in FIG. 5, a continuous annular ring disposed substantially at or near the open end 302 of canister 300 (although it will be understood that the flange means may disposed at any location along the length of the canister).

FIGS. 5 and 6 illustrate a presently preferred canister carrier 400. Carrier 400 includes canister receiving means in the form of at least one socket 402 for receiving a canister 300. As a practical matter it is preferred that canister holder include a plurality of sockets 402. In the illustrated example, carrier 400 includes six such sockets equiangularly arranged about the carrier. Carrier 400 is also preferably formed from HDPE or other moderately flexible plastic material. If made from such material, each socket 402 preferably has peripheral gap narrower in width than the outer diameter of the circumferential wall of canister 300. The gap is defined by a pair of opposed gripping fingers through which a canister may be inserted into and withdrawn from the socket. It will be appreciated that as a canister is inserted into the peripheral gap of a socket, fingers 404 are forced by the circumferential wall of the canister to flex outwardly to accommodate the canister. Once the canister is fully inserted the fingers return to their unstressed state and wrap around the canister to hold in firmly in place in the socket. When it is desired to remove a canister, a user simply pulls the canister radially outwardly causing outward flexure of fingers 404 until the gap is opened a sufficient amount to permit passage of the canister.

In order to prevent slippage of the canister carrier 400 relative to the canister(s) 300 held thereby, the canister carrier preferably includes means in the form of integral tabs 410 that define recesses 412 for receiving the cooperating flange or ring means 308 of canister 300. The canister carrier also preferably includes a plurality of apertures 414 through which a user's fingers may be inserted to facilitate gripping the carrier and carrying the canisters.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described mode for carrying out the invention that are obvious to those skilled in the art are intended to be within the scope of the following claims.

What is claimed is:

1. A fishing bait projectile forming system comprising:
at least one generally cylindrical canister having a circumferential wall, a first open end and a second closed end which define a longitudinal axis of said at least one canister therebetween, said circumferential wall is tapered toward said second end such that said first open end is larger in diameter than said second closed end, said at least one canister having support means on an outer surface of said second closed end, said support means comprising a plurality of radially arranged vanes extending generally parallel to said longitudinal axis of said at least one canister and being equiangularly disposed on said outer surface of said second closed end, wherein said at least one canister has sufficient volume to accommodate fishing tackle and a quantity of water sufficient to envelop the fishing tackle when the water is frozen;
a carrier including at least one generally circular shaped socket for releasably holding said at least one canister, said at least one socket comprises a gap defined between free ends of a pair of opposed curved gripping fingers through which said at least one canister may be inserted into and withdrawn from said at least one socket, said gap being narrower in width than a diameter of said circumferential wall; and
cooperating means carried by said at least one canister and said carrier for preventing slippage of said carrier with respect to said at least one canister, said cooperating means carried by said at least one canister comprising a flange at the first open end which extends both outwardly from said circumferential wall and in a plane perpendicular to said longitudinal axis of said at least one canister, said cooperating means of said carrier comprising a tab with first and second portions, said first portion comprising first and second ends, said first end of said first portion being on an upper surface of said carrier and said second end of said first portion being above said upper surface of said carrier such that said first portion extends perpendicular from said upper surface of said carrier, said second portion comprising first and second ends, said first end of said second portion being attached to said second end of said first portion and said second end of said second portion defining a curved free edge, said second portion extending in a plane which is generally parallel to said upper surface of said carrier, said first and second portions being perpendicular to each other, a recess being defined between said upper surface of said carrier and said tab which receives said flange at the first open end of said at least one canister therein, said tab and said gap being on diametrically opposite sides of a periphery of said at least one socket.

2. The system of claim 1 wherein at least one of said at least one canister and said carrier is fabricated from a moderately flexible and resilient plastic material.

3. A fishing line casting system comprising:
means for launching a fishing line carrying projectile comprising:
an elongate launching tube for receiving said fishing line carrying projectile, said elongate launching tube having proximal and distal ends,
a reservoir of compressed gas in fluid communication with said launching tube, said reservoir having proximal and distal ends,
at least one tube connected to and extending between said proximal ends of said elongate launching tube and said reservoir of compressed gas and providing the fluid communication therebetween,
valve means for permitting a flow of pressurized gas from said reservoir of compressed gas to said launching tube, said valve means being both manually actuatable and located on said at least one tube, said valve means comprising a handle and latch means for retaining said handle in position, said handle extending from said latch means, said latch means being pivotally attached to a valve within a chamber that is connected to and communicates with said at least one tube, said latch means also having an opening therethrough,
safety means for preventing inadvertent launch of said fishing line carrying projectile, said safety means comprising means for selectively locking said valve means in a closed position, said means for selectively locking comprising a plate extending outwardly from said at least one tube and mounting members having first ends attached at the plate and extending to second ends thereof in a direction which is transverse relative to said plate, each of said mounting members having an opening therethrough, said means for selectively locking further comprising a spring-loaded pin extending through said openings in said mounting members, and wherein when said latch means is pivoted such that said opening in said latch means is generally aligned with said openings in said mounting members and said spring-loaded pin extends through said opening of said latch means, said valve means is locked in the closed position and the handle is prevented from movement; and
front support means and rear support means for stably supporting said launching means during and between launches of a fishing line carrying projectile.

4. The system of claim 3 further comprising means for supporting a fishing rod.

5. The system of claim 4 further comprising means for adjusting a height of said fishing rod supporting means.

6. The system of claim 3 further comprising means for adjusting a height of at least one of said front and rear support means.

7. The system of claim 6 wherein said means for adjusting comprise means for adjusting the height of said rear support means.

8. The system of claim 3 further comprising means carried by at least one of said front and rear support means for securing said system to a surface.

9. The system of claim 3 wherein said front support means comprise at least two legs.

10. The system of claim 9 wherein said at least two legs are arranged in an inverted "V" formation.

11. The system of claim 3 wherein said rear support means comprise at least one leg.

12. A fishing line casting and fishing bait projectile forming system comprising:

means for launching a fishing line carrying projectile, said launching means including an elongate launching tube for receiving said fishing line carrying projectile, a reservoir of compressed gas in fluid communication with said launching tube, at least one tube extending between said launching tube and said reservoir of compressed gas, and valve means for permitting a flow of pressurized gas from said reservoir of compressed gas to said launching tube connected to and in communication with said at least one tube;

front support means and rear support means for stably supporting said launching means during and between launches of said fishing line carrying projectile; and at least one generally cylindrical canister having a circumferential wall, a first open end and a second closed end which define a longitudinal axis of said at least one canister therebetween, said circumferential wall being tapered toward said second end, said at least one canister having support means on an outer surface of said second closed end, said support means comprising a plurality of radially arranged vanes extending generally parallel to said longitudinal axis of said at least one canister and being equiangularly disposed on said outer surface of said second closed end, wherein said at least one canister has sufficient volume to accommodate fishing tackle and a quantity of water sufficient to envelop the fishing tackle when the water is frozen, and wherein the frozen water and fishing tackle enveloped therein define a fishing line carrying projectile adapted to be received in said launching tube.

13. The system of claim 12 further comprising a carrier including at least one socket for releasably holding said at least one canister.

14. The system of claim 13 wherein at least one of said at least one canister and said carrier is fabricated from a moderately flexible and resilient plastic material.

15. The system of claim 13 wherein said at least one socket comprises a gap defined by a pair of opposed gripping fingers through which said at least one canister may be inserted into and withdrawn from said at least one socket.

16. The system of claim 13 further comprising cooperating means carried by said at least one canister and said carrier for preventing slippage of said carrier with respect to said at least one canister.

17. The system of claim 16 wherein said cooperating means comprise radially outwardly projecting means carried by said at least one canister and recess means carried by said carrier for receiving said outwardly projecting means.

18. A method of forming and casting a fishing line carrying projectile comprising the steps of:

inserting fishing tackle into a canister having a circumferential wall, an open first end and a closed second end which define a longitudinal axis of said canister therebetween, said circumferential wall being tapered toward said second end, said canister having support means on an outer surface of said second closed end, said support means comprising a plurality of radially arranged vanes extending generally parallel to said longitudinal axis of said canister and being equianguarly disposed on said outer surface of said second closed end;

filling said canister with a quantity of water sufficient to envelop said fishing tackle when the water is frozen;

freezing the water to form a projectile;

removing the projectile from the canister;

connecting the projectile to fishing line;

inserting the fishing line carrying projectile into a launching tube; and launching the fishing line carrying projectile from the launching tube.

* * * * *